UNITED STATES PATENT OFFICE.

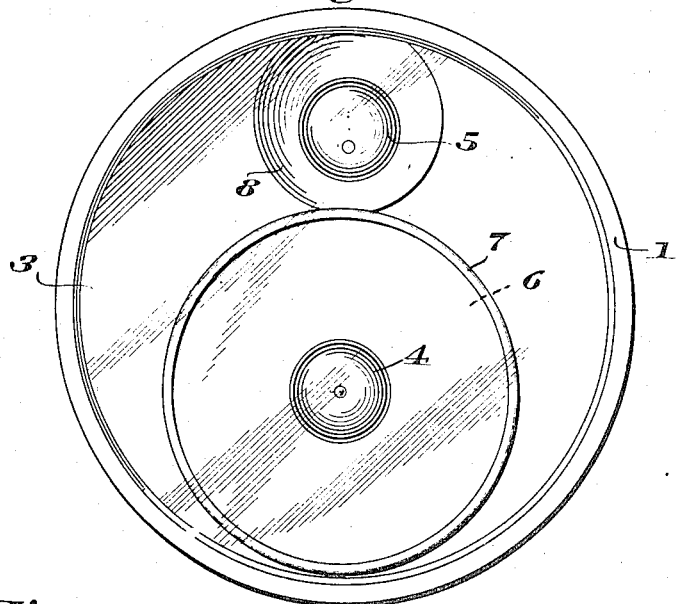
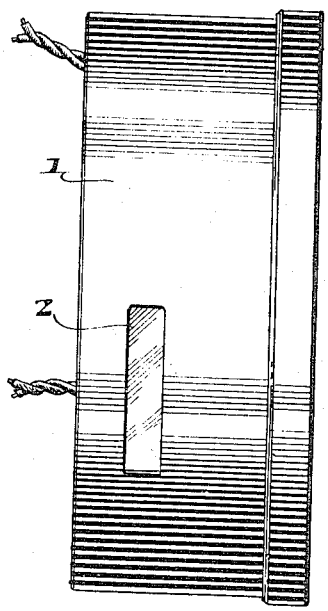
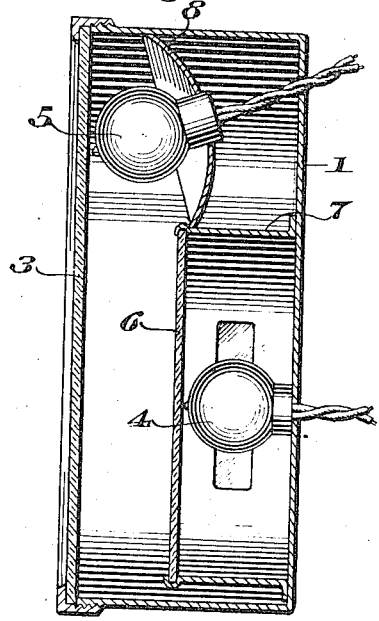

PETER COOPER, OF ADA, MICHIGAN.

TAIL-LAMP.

1,141,776.  Specification of Letters Patent.  Patented June 1, 1915.

Application filed November 21, 1914. Serial No. 873,401.

*To all whom it may concern:*

Be it known that I, PETER COOPER, a citizen of the United States, residing at Ada, in the county of Kent and State of Michigan, have invented new and useful Improvements in Tail-Lamps, of which the following is a specification.

This invention relates to tail lamps for automobiles, motor cars, trucks and the like, the object of the invention being to produce a lamp for use at the rear of a vehicle by means of which, in addition to the usual red light and the light for illuminating the license number-plate, another illuminating light is provided whereby the operator, in backing the machine into or out of a garage or in turning around at night or in other circumscribed places and under various conditions may illuminate that part of the roadway immediately adjacent to the rear of the vehicle equipped with the lamp of this invention.

With the above and other objects in view, the invention consists in the novel construction, combination and arrangement of parts, as herein described, illustrated and claimed.

In the accompanying drawings:—Figure 1 is a face view of a tail lamp embodying the present invention. Fig. 2 is a side or edge view of the same. Fig. 3 is a vertical diametrical section thereof.

The tail lamp contemplated in this invention, in the preferred embodiment thereof, comprises a cylindrical lamp case 1 which is provided in the peripheral wall thereof with a lateral or side port 2 covered with transparent uncolored glass so as to illuminate the usual license number-plate carried at the rear of the vehicle.

The face of the lamp is closed or covered by a transparent panel 3 of clear glass and behind said glass there are arranged two electric lamps 4 and 5 both of which are eccentrically located within the case 1. Between the lamp 4, which is located nearer the bottom of the case than the lamp 5, and the face of the case is a panel 6 preferably of red glass to produce the usual red light at the rear of the machine either while moving or standing.

7 designates a substantially cylindrical rim which surrounds the lamp 4 and which forms a support and holder for the red panel glass 6.

The auxiliary lamp 5 which is preferably located near the top of the case, is arranged behind the clear glass panel 3 and in front of a concaved reflector 8. This reflector is mounted between the rim 7 and the peripheral wall of the case 1 and has its top edge located farther to the rear than its bottom edge thereby imparting to the reflector a pitch or inclination which will cause the rays of light to be focused on the roadway immediately in rear of the vehicle equipped with the tail lamp.

The lamps 4 and 5 may be energized independently of each other so that the lamp 4 may burn continuously and the lamp 5 energized or flashed on only as may be found necessary when the operator is backing the machine.

The tail lamp hereinabove described will be found very useful at night time in many instances and places and under varying conditions where it is necessary for any reason to back the machine.

The device is particularly useful while backing a machine into an unlighted garage.

What I claim is:—

A vehicle tail lamp comprising a cylindrical lamp case, a pair of electric lamps mounted eccentrically therein and adapted to be independently energized, a panel of clear glass covering the illuminating face of said case, a colored panel behind the latter covering one of said lamps, and a reflector behind the other pitched at an inclination to focus the rays of light on the adjacent part of the roadway.

In testimony whereof I affix my signature in presence of two witnesses.

PETER COOPER.

Witnesses:
 JOHN MULDER,
 ADRIAN DAVIDSE.